US011012233B1

(12) United States Patent
Uhr et al.

(10) Patent No.: US 11,012,233 B1
(45) Date of Patent: May 18, 2021

(54) METHOD FOR PROVIDING AUTHENTICATION SERVICE BY USING DECENTRALIZED IDENTITY AND SERVER USING THE SAME

(71) Applicant: Coinplug, Inc., Seongnam-si (KR)

(72) Inventors: Joon Sun Uhr, Seongnam-si (KR); Joo Han Song, Seongnam-si (KR)

(73) Assignee: COINPLUG, INC., Seongnam-si (KR)

( * ) Notice: Subject to any disclaimer, the term of this patent is extended or adjusted under 35 U.S.C. 154(b) by 0 days.

(21) Appl. No.: 17/153,926

(22) Filed: Jan. 21, 2021

(30) Foreign Application Priority Data

Jan. 22, 2020 (KR) .................. 10-2020-0008950
Jan. 19, 2021 (KR) .................. 10-2021-0007284

(51) Int. Cl.
*H04L 9/08* (2006.01)
*H04L 29/08* (2006.01)
*H04L 9/32* (2006.01)

(52) U.S. Cl.
CPC .......... *H04L 9/0847* (2013.01); *H04L 9/0825* (2013.01); *H04L 9/3226* (2013.01); *H04L 9/3247* (2013.01); *H04L 67/02* (2013.01); *H04L 2209/38* (2013.01)

(58) Field of Classification Search
CPC ..... H04L 9/0847; H04L 67/02; H04L 9/3226; H04L 9/0825; H04L 9/3247; H04L 2209/38
See application file for complete search history.

(56) References Cited

U.S. PATENT DOCUMENTS

| 10,594,484 B2* | 3/2020 | Rodriguez ............ H04L 9/0822 |
| 2005/0132194 A1* | 6/2005 | Ward ..................... G07C 9/257 713/176 |
| 2005/0240774 A1* | 10/2005 | Angus .................... H04L 63/10 713/182 |
| 2009/0106549 A1* | 4/2009 | Mohamed .......... G06F 21/6218 713/156 |
| 2011/0238632 A1* | 9/2011 | Vandervort ............. G06F 16/93 707/690 |
| 2012/0308003 A1* | 12/2012 | Mukherjee ............ H04L 9/3247 380/243 |
| 2014/0108810 A1* | 4/2014 | Chenna .................. H04L 9/321 713/179 |

(Continued)

*Primary Examiner* — Darren B Schwartz
(74) *Attorney, Agent, or Firm* — Gearhart Law LLC; David Postolski, Esq.

(57) ABSTRACT

A method for providing an authentication service by using a decentralized identity (DID) application of a first user device, a mobile device, is provided. The method includes steps of: (a) if a signature verification value is transmitted from a service provider server in response to a DID service requested by a second user device, a DID authentication server transmitting the signature verification value to the DID application so that the DID application transmits a user signature and a user DID to the DID authentication server, and (b) verifying the user signature by using a user public key and transmitting signature verification result information to the service provider server, or transmitting the user signature and the user DID to the service provider server, to allow the service provider server to verify the user signature by using the user public key, to thereby provide the DID service to the second user device.

28 Claims, 4 Drawing Sheets

(56) References Cited

U.S. PATENT DOCUMENTS

| | | | |
|---|---|---|---|
| 2015/0220718 A1* | 8/2015 | Hong | H04L 63/0807 |
| | | | 726/9 |
| 2016/0134424 A1* | 5/2016 | Forget | H04L 9/3215 |
| | | | 713/176 |
| 2017/0257358 A1* | 9/2017 | Ebrahimi | H04L 9/3247 |
| 2019/0230092 A1* | 7/2019 | Patel | H04L 9/0869 |
| 2019/0251199 A1* | 8/2019 | Klianev | G06Q 40/04 |
| 2019/0266372 A1* | 8/2019 | Ushiki | G06K 7/1417 |
| 2019/0303587 A1* | 10/2019 | Hamel | H04L 9/30 |
| 2020/0026834 A1* | 1/2020 | Vimadalal | G06F 16/182 |
| 2020/0036707 A1* | 1/2020 | Callahan | H04L 9/3231 |
| 2020/0053072 A1* | 2/2020 | Glozman | H04L 63/0869 |
| 2020/0067907 A1* | 2/2020 | Avetisov | H04L 9/3218 |
| 2020/0127828 A1* | 4/2020 | Liu | H04L 9/30 |
| 2020/0127832 A1* | 4/2020 | Ebrahimi | H04L 63/0815 |
| 2020/0127845 A1* | 4/2020 | Yang | H04L 9/0643 |
| 2020/0134066 A1* | 4/2020 | Yegorin | H04L 9/3239 |
| 2020/0137064 A1* | 4/2020 | Wu | H04L 9/3239 |
| 2020/0145209 A1* | 5/2020 | Yang | G06F 16/2379 |
| 2020/0153606 A1* | 5/2020 | Li | H04L 63/08 |
| 2020/0220731 A1* | 7/2020 | Schmitt | H04L 67/303 |
| 2020/0403805 A1* | 12/2020 | Steele | H04L 9/0891 |
| 2020/0403810 A1* | 12/2020 | Murdoch | G06F 7/58 |

* cited by examiner

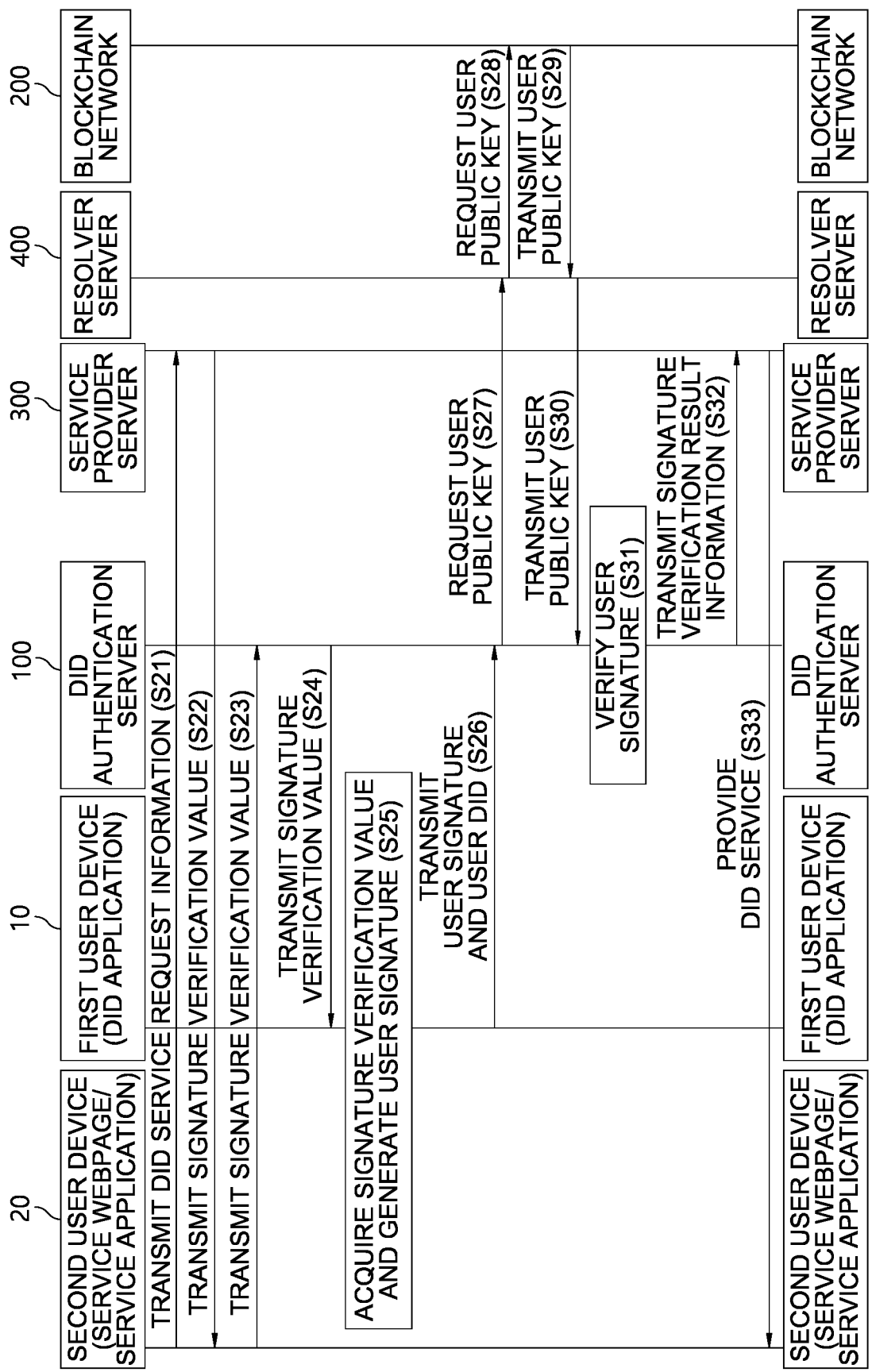

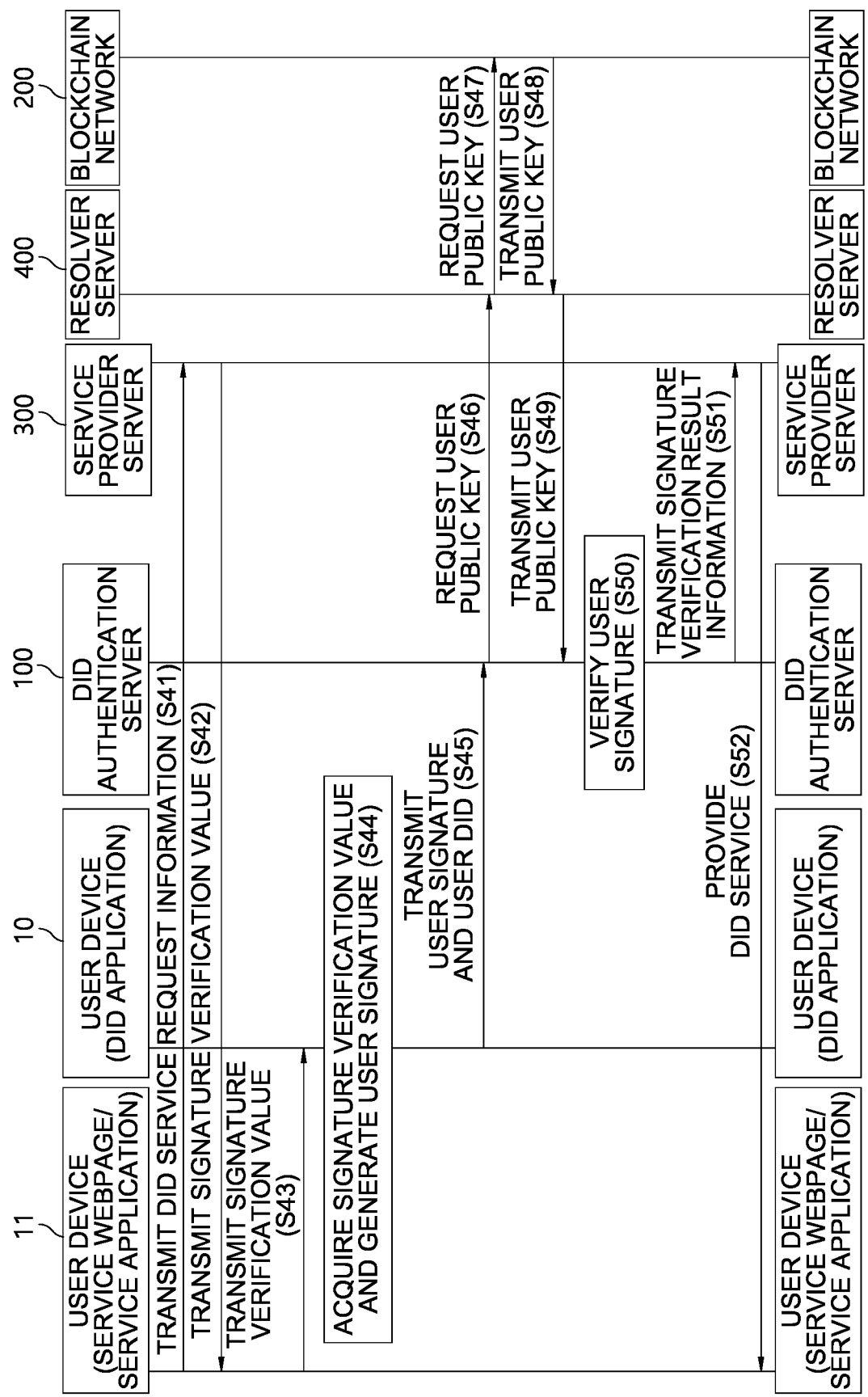

METHOD FOR PROVIDING AUTHENTICATION SERVICE BY USING DECENTRALIZED IDENTITY AND SERVER USING THE SAME

CROSS REFERENCE OF RELATED APPLICATION

This present application claims the benefit of Korean non-provisional patent application No. 10-2021-0007284, filed on Jan. 19, 2021, which claims the benefit of Korean provisional patent application No. 10-2020-0008950, filed on Jan. 22, 2020, both of which disclosures are incorporated herein by reference.

FIELD OF THE DISCLOSURE

The present disclosure relates to a method for providing an authentication service by using a Decentralized Identity (DID) application; and more particularly, to the method for providing the authentication service for a user of a service provider server by using the DID application installed on a user mobile device, and a DID authentication server using the same.

BACKGROUND OF THE DISCLOSURE

User authentication generally refers to a process of determining whether a user can be trusted by verifying whether the user is legitimately registered in a database of a service provider server. The user authentication plays an important role in managing user access rights for services provided by the service provider server and detecting illegal activities.

Various technologies are used for the user authentication, and some of them include single-factor authentication using a combination of a user ID and a password, two-factor authentication using a combination of two verification means such as a card and a password, a shared key authentication using a secret key shared between involved parties, and biological methods such as fingerprint recognition or iris recognition.

However, since it is a convention for each of multiple service provider servers to store multiple pieces of user information belonging to their own users, risk of user information leakage due to server hacking increases as the number of the service provider servers storing the user information increases.

In addition, the distribution of the user information across the multiple service provider servers makes it difficult for the user to manage his or her history of providing the user information and requires the user to manually amend the user information of each and every service provider server when there is a change to his or her user information. This difficulty of managing one's own user information also gives rise to a potential risk of user ID theft.

Adding to this, the conventional user authentication causes inconveniences of having to memorize both the user ID and the password for each and every service provider server and having to repeatedly input the user information every time the user newly subscribes to the services.

Meanwhile, as an alternative to solve these problems of such centralized user authentication used by the service provider servers, a method of managing the user information by using a blockchain network technology with an improved security and stability is proposed.

A blockchain network uses distributed ledgers to allow multiple participants to jointly manage a series of synchronized ledgers, and this significantly reduces the risk of hacking. Since data on the distributed ledgers is open to all participants, the user information being registered on the distributed ledgers has to be encrypted, for example, by converting the user information to a hash value.

However, even when using the blockchain network, the user is still required to obtain a user ID from each service provider server.

Therefore, an enhanced method for solving the aforementioned problems is required.

SUMMARY OF THE DISCLOSURE

It is an object of the present disclosure to solve all the aforementioned problems.

It is another object of the present disclosure to enable user authentication without requiring a service provider server to issue a user ID.

It is still another object of the present disclosure to enable the user authentication on the service provider server without requiring additional information for the user authentication.

It is still yet another object of the present disclosure to perform the user authentication by using a decentralized identity (DID) application installed on a user device.

It is still yet another object of the present disclosure to provide an authentication service to the service provider server by using the DID application.

In accordance with one aspect of the present disclosure, there is provided a method for providing an authentication service by using a decentralized identity (DID) application of a first user device which is a mobile device, including steps of: (a) if a signature verification value generated from a service provider server is transmitted via a second user device in response to a DID service request information corresponding to a DID service requested by the second user device, a DID authentication server performing or supporting another device to perform a process of transmitting the signature verification value to the DID application installed on the first user device to thereby allow the DID application of the first user device to generate a user signature by signing the signature verification value with a user private key and thus transmit the user signature and a user DID to the DID authentication server, wherein the second user device accessing the DID service provided by the service provider server through a service web page or a service application is a separate device from the first user device installed with the DID application which has been used for registering the user DID on a blockchain network comprised of a plurality of nodes; and (b) in response to receiving the user signature and the user DID from the DID application of the first user device, the DID authentication server performing or supporting another device to perform a process of (i) acquiring a user public key from the blockchain network directly by using the user DID or acquiring the user public key from the blockchain network through a resolver server by using the user DID, and thus verifying the user signature by using the user public key and transmitting signature verification result information acquired by verifying the user signature to the service provider server, to thereby allow the service provider server to provide the DID service corresponding to the DID service request information to the second user device by referring to the signature verification result information, or (ii) transmitting the user signature and the user DID to the service provider server, to thereby allow the service provider server to acquire the user public key from the blockchain network directly by using the user DID or acquire the user public key from the blockchain network through the resolver server by using the user DID, and thus verify the user signature by using the user public key and provide the DID service corresponding to the DID service request information to the second user device.

As one example, at the step of (a), (i) if the signature verification value is transmitted from the service provider server without the user DID, the DID authentication server performs or supports another device to perform a process of generating a QR code corresponding to the signature verification value and thus transmitting the QR code to the second user device, to thereby allow the first user device to acquire the signature verification value from the QR code displayed on the second user device and thus provide the signature verification value to the DID application, and (ii) if both the signature verification value and the user DID are transmitted from the service provider server, the DID authentication server performs or supports another device to perform a process of transmitting the signature verification value to the DID application of the first user device by using the user DID.

As another example, in case both the signature verification value and the user DID are transmitted from the service provider server, if the DID application fails to receive the signature verification value, the DID authentication server performs or supports another device to perform a process of generating the QR code corresponding to the signature verification value and thus transmitting the QR code to the second user device, to thereby allow the first user device to acquire the signature verification value from the QR code displayed on the second user device and thus transmit the signature verification value to the DID application.

As another example, if the service provider server transmits a user information list corresponding to user information additionally required by the DID service to the second user device, the DID authentication server performs or supports another device to perform a process of transmitting the signature verification value and the user information list to the DID application of the first user device, to thereby allow the DID application of the first user device to transmit the user information corresponding to the user information list or encrypted user information corresponding to the user information list along with the user signature and the user DID to the DID authentication server, such that the user information or the encrypted user information is transmitted to the service provider server along with the signature verification result information or along with the user signature and the user DID.

As another example, at the step of (a), the DID authentication server performs or supports another device to perform a process of allowing the DID application of the first user device to transmit the signature verification value along with the user signature and the user DID to the DID authentication server.

As another example, at the step of (a), the DID authentication server performs or supports another device to perform a process of allowing the DID application of the first user device to transmit a VC (Verifiable Credential) or a VP (Verifiable Presentation) along with the user signature and the user DID to the DID authentication server.

As another example, at the step of (a), the DID authentication server performs or supports another device to perform a process of allowing the service provider server to transmit the signature verification value to the second user device through HTTP redirection, and thus acquiring the signature verification value by allowing the second user device to transmit the signature verification value to a DID authentication webpage corresponding to the DID authentication server through the HTTP redirection.

As another example, at the step of (b), if the user signature and the user DID are transmitted from the DID application of the first user device, the DID authentication server performs or supports another device to perform a process of transmitting the user signature and the user DID or the signature verification result information, generated by referring to the user signature and the user DID, to a DID authentication webpage corresponding to the DID authentication server through HTTP polling, and thus transmitting the user signature and the user DID or the signature verification result information to the service provider server through HTTP redirection.

In accordance with another aspect of the present disclosure, there is provided a method for providing an authentication service by using a decentralized identity (DID) application of a user device which is a mobile device, including steps of: (a) if a signature verification value generated from a service provider server is transmitted to a service webpage or a service application of the user device and then provided to the DID application of the user device in response to a DID service request information corresponding to a DID service requested through the service webpage or the service application of the user device, a DID authentication server performing or supporting another device to perform a process of allowing the DID application of the user device to generate a user signature by signing the signature verification value with a user private key and thus transmit the user signature and a user DID to the DID authentication server, wherein the DID application has been used for registering the user DID on a blockchain network comprised of a plurality of nodes; and (b) in response to receiving the user signature and the user DID from the DID application of the user device, the DID authentication server performing or supporting another device to perform a process of (i) acquiring a user public key from the blockchain network directly by using the user DID or acquiring the user public key from the blockchain network through a resolver server by using the user DID, and thus verifying the user signature by using the user public key and transmitting signature verification result information acquired by verifying the user signature to the service provider server, to thereby allow the service provider server to provide the DID service corresponding to the DID service request information to the user device by referring to the signature verification result information, or (ii) transmitting the user signature and the user DID to the service provider server, to thereby allow the service provider server to acquire the user public key from the blockchain network directly by using the user DID or acquire the user public key from the blockchain network through the resolver server by using the user DID, and thus verify the user signature by using the user public key and provide the DID service corresponding to the DID service request information to the user device.

As one example, at the step of (a), the DID authentication server performs or supports another device to perform a process of allowing the service webpage or the service application of the user device to provide the signature verification value to the DID application of the user device through URL scheme.

As another example, if the service provider server transmits a user information list corresponding to user information additionally required by the DID service to the service webpage or the service application of the user device and thus the signature verification value and the user information list are provided to the DID application of the user device, the DID authentication server performs or supports another device to perform a process of allowing the DID application of the user device to transmit the user information corresponding to the user information list or encrypted user information corresponding to the user information list along with the user signature and the user DID to the DID authentication server, such that the user information or the encrypted user information is transmitted to the service provider server along with the signature verification result information or the user signature and the user DID being transmitted.

As another example, at the step of (a), the DID authentication server performs or supports another device to perform a process of allowing the DID application of the user device to transmit the signature verification value along with the user signature and the user DID to the DID authentication server.

As another example, at the step of (a), the DID authentication server performs or supports another device to perform a process of allowing the DID application of the user device to transmit a VC (Verifiable Credential) or a VP (Verifiable Presentation) along with the user signature and the user DID to the DID authentication server.

As another example, at the step of (b), the DID authentication server performs or supports another device to perform (i) a process of transmitting the user signature and the user DID transmitted from the DID application of the user device or the signature verification result information, generated by referring to the user signature and the user DID, to a DID authentication webpage corresponding to the DID authentication server through HTTP polling, to thereby transmit the user signature and the user DID or the signature verification result information to the service provider server through HTTP redirection, (ii) a process of allowing the DID application of the user device to transmit the user signature and the user DID to the service webpage or the service application of the user device through URL scheme, to thereby allow the service webpage or the service application of the user device to transmit the user signature and the user DID to the service provider server through the HTTP redirection, or (iii) a process of allowing the DID application of the user device to transmit the user signature and the user DID to the DID authentication server, to thereby allow the service webpage or the service application of the user device to acquire the user signature and the user DID or the signature verification result information, generated by referring to the user signature and the user DID, from the DID authentication server through HTTP polling, and thus transmit the user signature and the user DID or the signature verification result information to the service provider server through the HTTP redirection.

As another example, at the step of (a), the DID authentication server performs or supports another device to perform a process of allowing the service provider server to only transmit the signature verification value to the user device or to transmit both the signature verification value and the user DID to the user device.

In accordance with still another aspect of the present disclosure, there is provided a DID (decentralized identity) authentication server for providing an authentication service by using a DID application of a first user device which is a mobile device, including: at least one memory that stores instructions; and at least one processor configured to execute the instructions to perform or support another device to perform: (I) if a signature verification value generated from a service provider server is transmitted via a second user device in response to a DID service request information corresponding to a DID service requested by the second user device, a process of transmitting the signature verification value to the DID application installed on the first user device to thereby allow the DID application of the first user device to generate a user signature by signing the signature verification value with a user private key and thus transmit the user signature and a user DID to the processor, wherein the second user device accessing the DID service provided by the service provider server through a service web page or a service application is a separate device from the first user device installed with the DID application which has been used for registering the user DID on a blockchain network comprised of a plurality of nodes, and (II) in response to receiving the user signature and the user DID from the DID application of the first user device, a process of (i) acquiring a user public key from the blockchain network directly by using the user DID or acquiring the user public key from the blockchain network through a resolver server by using the user DID, and thus verifying the user signature by using the user public key and transmitting signature verification result information acquired by verifying the user signature to the service provider server, to thereby allow the service provider server to provide the DID service corresponding to the DID service request information to the second user device by referring to the signature verification result information, or (ii) transmitting the user signature and the user DID to the service provider server, to thereby allow the service provider server to acquire the user public key from the blockchain network directly by using the user DID or acquire the user public key from the blockchain network through the resolver server by using the user DID, and thus verify the user signature by using the user public key and provide the DID service corresponding to the DID service request information to the second user device.

As one example, at the process of (I), (i) if the signature verification value is transmitted from the service provider server without the user DID, the processor performs or supports another device to perform a process of generating a QR code corresponding to the signature verification value and thus transmitting the QR code to the second user device, to thereby allow the first user device to acquire the signature verification value from the QR code displayed on the second user device and thus provide the signature verification value to the DID application, and (ii) if both the signature verification value and the user DID are transmitted from the service provider server, the processor performs or supports another device to perform a process of transmitting the signature verification value to the DID application of the first user device by using the user DID.

As another example, in case both the signature verification value and the user DID are transmitted from the service provider server, if the DID application fails to receive the signature verification value, the processor performs or supports another device to perform a process of generating the QR code corresponding to the signature verification value and thus transmitting the QR code to the second user device, to thereby allow the first user device to acquire the signature verification value from the QR code displayed on the second user device and thus transmit the signature verification value to the DID application.

As another example, if the service provider server transmits a user information list corresponding to user information additionally required by the DID service to the second user device, the processor performs or supports another device to perform a process of transmitting the signature verification value and the user information list to the DID application of the first user device, to thereby allow the DID application of the first user device to transmit the user information corresponding to the user information list or encrypted user information corresponding to the user information list along with the user signature and the user DID to the processor, such that the user information or the encrypted user information is transmitted to the service provider server along with the signature verification result information or along with the user signature and the user DID.

As another example, at the process of (I), the processor performs or supports another device to perform a process of allowing the DID application of the first user device to transmit the signature verification value along with the user signature and the user DID to the processor.

As another example, at the process of (I), the processor performs or supports another device to perform a process of allowing the DID application of the first user device to transmit a VC (Verifiable Credential) or a VP (Verifiable Presentation) along with the user signature and the user DID to the processor.

As another example, at the process of (I), the processor performs or supports another device to perform a process of allowing the service provider server to transmit the signature verification value to the second user device through HTTP redirection, and thus acquiring the signature verification value by allowing the second user device to transmit the signature verification value to a DID authentication webpage corresponding to the processor through the HTTP redirection.

As another example, at the process of (II), if the user signature and the user DID are transmitted from the DID application of the first user device, the processor performs or supports another device to perform a process of transmitting the user signature and the user DID or the signature verification result information, generated by referring to the user signature and the user DID, to a DID authentication webpage corresponding to the processor through HTTP polling, and thus transmitting the user signature and the user DID or the signature verification result information to the service provider server through HTTP redirection.

In accordance with still yet another aspect of the present disclosure, there is provided a DID (decentralized identity) authentication server for providing an authentication service by using a DID application of a first user device which is a mobile device, including: at least one memory that stores instructions; and at least one processor configured to execute the instructions to perform or support another device to perform: (I) if a signature verification value generated from a service provider server is transmitted to a service webpage or a service application of the user device and then provided to the DID application of the user device in response to a DID service request information corresponding to a DID service requested through the service webpage or the service application of the user device, a process of allowing the DID application of the user device to generate a user signature by signing the signature verification value with a user private key and thus transmit the user signature and a user DID to the processor, wherein the DID application has been used for registering the user DID on a blockchain network comprised of a plurality of nodes, and (II) in response to receiving the user signature and the user DID from the DID application of the user device, a process of (i) acquiring a user public key from the blockchain network directly by using the user DID or acquiring the user public key from the blockchain network through a resolver server by using the user DID, and thus verifying the user signature by using the user public key and transmitting signature verification result information acquired by verifying the user signature to the service provider server, to thereby allow the service provider server to provide the DID service corresponding to the DID service request information to the user device by referring to the signature verification result information, or (ii) transmitting the user signature and the user DID to the service provider server, to thereby allow the service provider server to acquire the user public key from the blockchain network directly by using the user DID or acquire the user public key from the blockchain network through the resolver server by using the user DID, and thus verify the user signature by using the user public key and provide the DID service corresponding to the DID service request information to the user device.

As one example, at the process of (I), the processor performs or supports another device to perform a process of allowing the service webpage or the service application of the user device to provide the signature verification value to the DID application of the user device through URL scheme.

As another example, if the service provider server transmits a user information list corresponding to user information additionally required by the DID service to the service webpage or the service application of the user device and thus the signature verification value and the user information list are provided to the DID application of the user device, the processor performs or supports another device to perform a process of allowing the DID application of the user device to transmit the user information corresponding to the user information list or encrypted user information corresponding to the user information list along with the user signature and the user DID to the processor, such that the user information or the encrypted user information is transmitted to the service provider server along with the signature verification result information or the user signature and the user DID being transmitted.

As another example, at the process of (I), the processor performs or supports another device to perform a process of allowing the DID application of the user device to transmit the signature verification value along with the user signature and the user DID to the processor.

As another example, at the process of (I), the processor performs or supports another device to perform a process of allowing the DID application of the user device to transmit a VC (Verifiable Credential) or a VP (Verifiable Presentation) along with the user signature and the user DID to the processor. As another example, at the process of (II), the processor performs or supports another device to perform (i) a process of transmitting the user signature and the user DID transmitted from the DID application of the user device or the signature verification result information, generated by referring to the user signature and the user DID, to a DID authentication webpage corresponding to the processor through HTTP polling, to thereby transmit the user signature and the user DID or the signature verification result information to the service provider server through HTTP redirection, (ii) a process of allowing the DID application of the user device to transmit the user signature and the user DID to the service webpage or the service application of the user device through URL scheme, to thereby allow the service webpage or the service application of the user device to transmit the user signature and the user DID to the service provider server through the HTTP redirection, or (iii) a process of allowing the DID application of the user device to transmit the user signature and the user DID to the processor, to thereby allow the service webpage or the service application of the user device to acquire the user signature and the user DID or the signature verification result information, generated by referring to the user signature and the user DID, from the processor through HTTP polling, and thus transmit the user signature and the user DID or the signature verification result information to the service provider server through the HTTP redirection.

As another example, at the process of (I), the process performs or supports another device to perform a process of allowing the service provider server to only transmit the signature verification value to the user device or to transmit both the signature verification value and the user DID to the user device.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 3 is a drawing schematically illustrating a method of providing the authentication service to the service provider server by using the DID application in accordance with another example embodiment of the present disclosure.

FIG. 4 is a drawing schematically illustrating a method of providing the authentication service to the service provider server by using the DID application in accordance with still another example embodiment of the present disclosure.

DETAILED DESCRIPTION OF THE PREFERRED EMBODIMENTS

Figure 1:
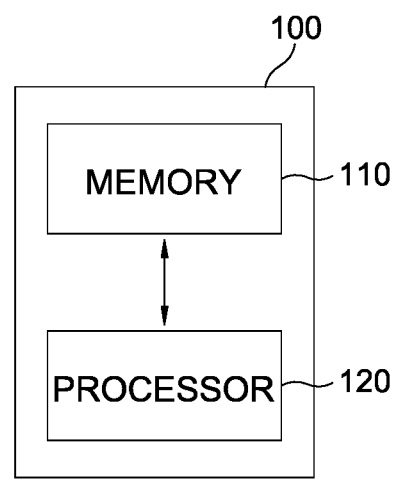
FIG. 1 is a drawing schematically illustrating a decentralized identity (DID) authentication server providing an authentication service to a service provider server by using a DID application in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a decentralized identity (DID) authentication server providing an authentication service to a service provider server by using a DID application in accordance with one example embodiment of the present disclosure.

By referring to FIG. 1, the DID authentication server 100 may include a memory 110 for providing the authentication service to the service provider server by using the DID application, and a processor 120 for providing the authentication service to the service provider server by using the DID application according to the instructions in the memory 110.

Specifically, the DID authentication server 100 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processor of the computing device may include hardware configuration of MPU (Micro Processing Unit) or CPU (Central Processing Unit), cache memory, data bus, etc. Additionally, the computing device may further include OS and software configuration of applications that achieve specific purposes.

A process of providing the authentication service to the service provider server through the DID application in accordance with one example embodiment of the present disclosure by using the DID authentication server 100 configured as explained above is described by referring to FIG. 2. Herein, FIG. 2 in accordance with one example embodiment of the present disclosure is schematically illustrating a method in which the DID authentication server 100 provides the authentication service for a user by using the DID application in case the service provider server does not know a user DID of the user.

Herein, a method of generating the user DID is first explained prior to demonstrating the method for providing the authentication service through the DID application.

First, in order to generate the user DID, the user may make a request for an issuance of the user DID to a blockchain network 200 (not shown) by using the DID application 10 installed on a first user device which is a mobile device.

Then, in response to the request for the issuance of the user DID from the DID application of the first user device, at least one node included in the blockchain network 200 may generate the user DID and store DID information corresponding to the user DID in a distributed ledger of the blockchain network 200 (not shown). Herein, the DID information may include the user DID, a user public key of the user, an authentication information for user private information, but is not limited thereto, and may include various information related to the user DID.

Also, the DID application 10 of the first user device may store the user private information related to the user DID (not shown). For example, the DID application 10 of the first user device may store Verifiable Credential (VC) corresponding to the user private information verified by an authentication server in the first user device. Also, the blockchain network 200 sharing the distributed ledger with a plurality of nodes may generate blocks comprised of transactions verified by a distributed consensus from the nodes and store the blocks in the distributed ledger (not shown).

Thereafter, in a process of using a plurality of services provided by the service provider server 300 through a service webpage or a service application 20 of a second user device, the user who has created the user DID as explained above may select a DID service, such as a membership subscription service, a verification service, a transaction service, etc., that requires the user DID. In turn, the service webpage or the service application 20 of the second user device may transmit a DID service request information corresponding to the DID service to the service provider server 300 at a step of S1. Herein, the second user device is a separate device from the first user device installed with the DID application which has been used for registering the user DID on the blockchain network 200. Also, the second user device may be a device, such as a mobile device, a personal computer (PC), a laptop, a tablet, etc., capable of accessing the service provider server 300 through wired or wireless communication. Herein, the first user device and the second user device may be owned by the same user.

In response to receiving the DID service request information from the service webpage or the service application 20 of the second user device, the service provider server 300 may generate a signature verification value and transmit the signature verification value to the service webpage or the service application 20 of the second user device at a step of S2. At the step of S2, the signature verification value may be transmitted without the user DID, since the service provider server 300 does not know the user DID. Herein, the service provider server 300 may not know the user DID if the service webpage or the service application 20 of the second user device is accessing the services provided by the service provider server 300 without logging into the service provider server 300 or without subscribing to the services provided by the service provider server 300 as a member.

Herein, the signature verification value may be an arbitrary value that is generated in a random manner to ensure that the signature verification value generated for each user authentication is different from each other. Also, the signature verification value may include a nonce, a timestamp, etc., but is not limited thereto and may include all randomly generated values.

In addition, when the DID service, such as the membership subscription service, requires additional user information, such as a name, a phone number, etc., the service provider server 300 may transmit a user information list corresponding to the user information at the same time with the signature verification value to the service webpage or the service application 20 of the second user device.

When the signature verification value is being transmitted from the service provider server 300, the service provider server 300 may transmit the signature verification value to the service webpage or the service application 20 of the second user device through HTTP redirection, and the service webpage or the service application 20 of the second user device may in turn transmit the signature verification value to a DID authentication webpage corresponding to the DID authentication server 100 through the HTTP redirection at a step of S3.

Next, the DID authentication server 100 may generate a QR code corresponding to the signature verification value at a step of S4 and transmit the QR code to the second user device at a step of S5 so that the service webpage or the service application 20 of the second user device may display the QR code on the service webpage or the service application for the user to know. Then, the user may acquire the QR code at a step of S6 by photographing the QR code displayed on the service webpage or the service application 20 of the second user device with the DID application 10 of the first user device.

Following, the DID application 10 of the first user device may acquire the signature verification value by interpreting the QR code and generate a user signature by signing the signature verification value with a user private key at a step of S7.

Next, the DID application 10 of the first user device may transmit the user signature and the user DID to the DID authentication server 100 at a step of S8. Herein, the DID application 10 of the first user device may transmit the signature verification value along with the user signature and the user DID to the DID authentication server 100. Also, if the QR code contains the user information list in addition to the signature verification value, the DID application 10 of the first user device may transmit the user information corresponding to the user information list or encrypted user information corresponding to the user information list along with the user signature and the user DID. Furthermore, the DID application 10 of the first user device may additionally transmit the VC (Verifiable Credential) or a VP (Verifiable Presentation) along with the user signature and the user DID to the DID authentication server 100.

In response to receiving the user signature and the user DID from the DID application 10 of the first user device, the DID authentication server 100 may acquire the user public key directly from the blockchain network 200 by using the user DID or request the user public key through a resolver server 400 at a step of S9. In the latter case, the resolver server 400 may request for the user public key to the blockchain network 200 by using the user DID at a step of S10. Once the user public key is acquired by the resolver server 400 from the blockchain network 200 at a step of S11, the DID authentication server 100 may acquire the user public key from the resolver server 400 at a step of S12.

Subsequently, the DID authentication server 100 may verify the user signature at a step of S13 by verifying whether the signature verification value obtained from decoding the user signature with the user public key matches with the signature verification value transmitted along with the user signature from the DID application 10 of the first user device and transmit signature verification result information acquired by verifying the user signature to the service provider server 300 at a step of S14. Herein, as requested by the service provider server 300, the DID authentication server 100 may additionally transmit the user information corresponding to the user information list or the encrypted user information corresponding to the user information list to the service provider server 300.

Then, the service provider server 300 may provide the DID service corresponding to the DID service request information to the service webpage or the service application 20 of the second user device by referring to the signature verification result information at a step of S15. Also, the service provider server 300 may perform processes necessary for providing the DID service by referring to the user information or the encrypted user information acquired from the DID authentication server 100.

On the other hand, while it is possible for the DID authentication server 100 to verify the user signature by using the user signature and the user DID as explained above, it is also possible for the service provider server 300 to verify the user signature by using the user signature and the user DID transmitted from the DID authentication server 100. Accordingly, if the DID authentication server 100 transmits the user signature and the user DID to the service provider server 300, the service provider server 300 may acquire the user public key from the blockchain network 200 directly by using the user DID or acquire the user public key from the blockchain network 200 through the resolver server 400 by using the user DID, and thus verify the user signature by using the user public key and provide the DID service corresponding to the DID service request information to the service webpage or the service application 20 of the second user device. Herein, the service provider server 300 may verify the user signature by using the signature verification value generated in response to the DID service request information transmitted from the service webpage or the service application 20 of the second user device.

Herein, when the user signature and the user DID are transmitted from the DID application 10 of the first user device, the DID authentication server 100 may transmit the user signature and the user DID or the signature verification result information, generated by referring to the user signature and the user DID, to the DID authentication webpage corresponding to the DID authentication server 100 through HTTP polling, and thus transmit the user signature and the user DID or the signature verification result information to the service provider server 300 through HTTP redirection.

Figure 2:
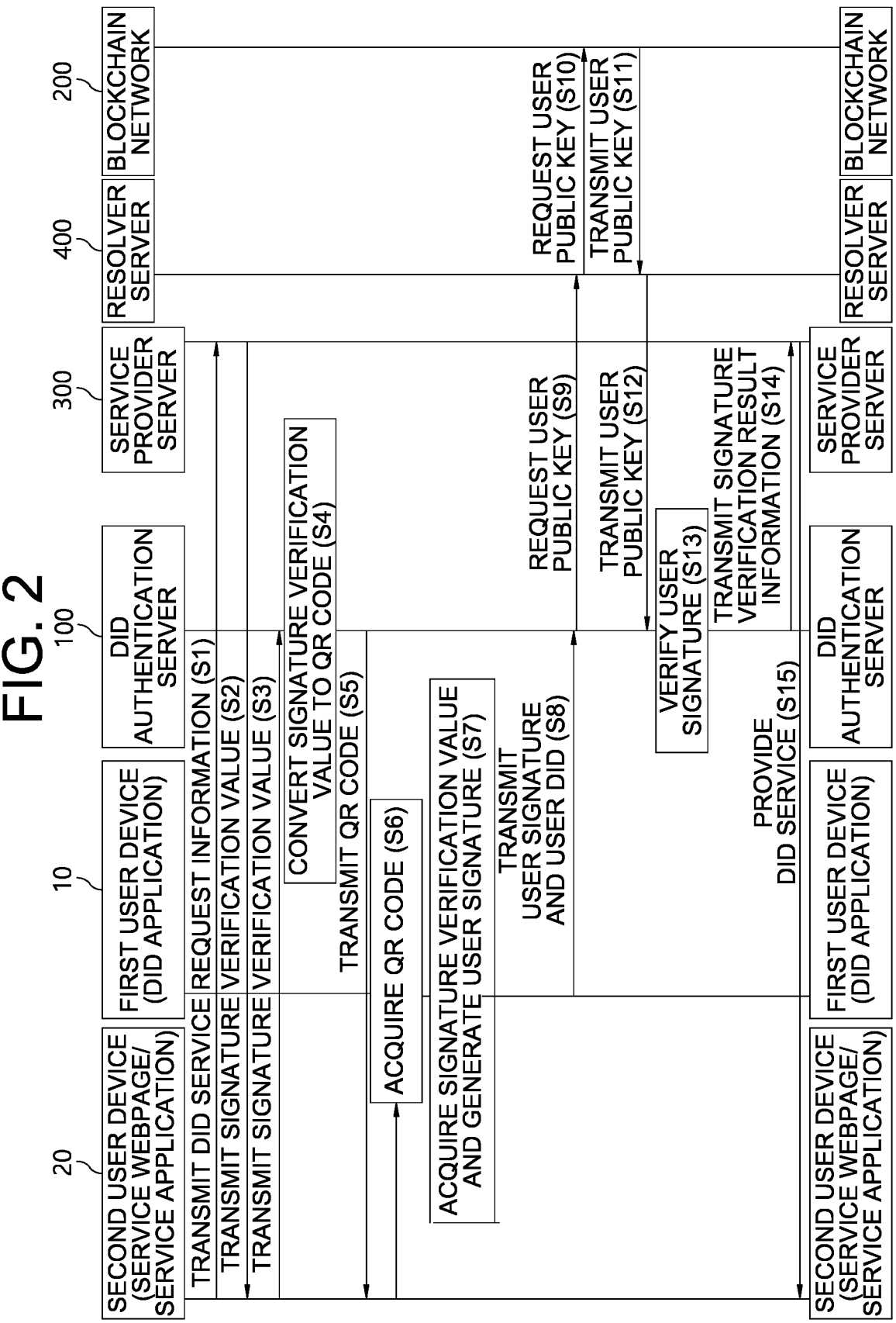
FIG. 2 is a drawing schematically illustrating a method of providing the authentication service to the service provider server by using the DID application in accordance with one example embodiment of the present disclosure.

Another process of providing the authentication service to the service provider server 300 through the DID application 10 in accordance with another example embodiment of the present disclosure by using the DID authentication server 100 configured as explained in FIG. 1 is described by referring to FIG. 3. In the following description, detailed explanation of parts that can be easily understood from the description provided by referring to FIG. 2 are omitted. While FIG. 2 in accordance with one example embodiment of the present disclosure is schematically illustrating the method in which the DID authentication server 100 provides the authentication service when the service provider server 300 does not know the user DID, FIG. 3 in accordance with another example embodiment of the present disclosure is schematically illustrating a method in which the DID authentication server 100 provides the authentication service when the service provider server 300 knows the user DID. Herein, the service provider server 300 may know the user DID if the service webpage or the service application 20 of second user device is accessing the services provided by the service provider server 300 through logging into the service provider server 300 or through subscribing to the services provided by the service provider server 300 as a member.

Herein, the method of generating the user DID is first explained prior to demonstrating the method for providing the authentication service through the DID application.

First, in order to generate the user DID (decentralized identity), the user may make the request for the issuance of the user DID to the blockchain network 200 (not shown) by using the DID application 10 installed on the first user device which is the mobile device.

Then, in response to the request for the issuance of the user DID from the DID application of the first user device, at least one node included in the blockchain network 200 may generate the user DID and store the DID information corresponding to the user DID in the distributed ledger of the blockchain network 200 (not shown).

Thereafter, in a process of using the services provided by the service provider server 300 through the service webpage or the service application 20 on the second user device, the user who has created the user DID as explained above may select the DID service, such as the membership subscription service, the verification service, the transaction service, etc., that requires the user DID. In turn, the service webpage or the service application 20 of the second user device may transmit the DID service request information corresponding to the DID service to the service provider server 300 at a step of S21.

In response to receiving the DID service request information from the service webpage or the service application 20 of the second user device, the service provider server 300 may generate the signature verification value and transmit the signature verification and the user DID to the service webpage or the service application 20 of the second user device at a step of S22.

In addition, when the DID service, such as the membership subscription service, requires additional user information, such as the name, the phone number, etc., the service provider server 300 may transmit the user information list corresponding to the user information at the same time with the signature verification value to the service webpage or the service application 20 of the second user device.

When the signature verification value and the user DID are being transmitted by the service provider server 300, the service provider server 300 may transmit the signature verification value and the user DID to the service webpage or the service application 20 of the second user device through the HTTP redirection, and the service webpage or the service application 20 of the second user device may in turn transmit the signature verification value and the user DID to the DID authentication webpage corresponding to the DID authentication server 100 through the HTTP redirection at a step of S23.

Next, the DID authentication server 100 may acquire the signature verification value and the user DID through PUSH from the DID authentication webpage, and then transmit the signature verification value to the DID application 10 of the first user device by using the user DID at a step of S24.

Meanwhile, in case the DID application 10 of the first user device fails to receive the signature verification value through the PUSH from the DID authentication webpage, the DID authentication server 100 may generate the QR code corresponding to the signature verification value through the DID authentication webpage and transmit the QR code to the second user device so that the service webpage or the service application 20 of the second user device may display the QR code on the service webpage or the service application for the user to know. Then, the user may acquire the QR code by photographing the QR code displayed on the service webpage or the service application 20 of the second user device with the DID application 10 of the first user device and subsequently the DID application 10 of the first user device may acquire the signature verification value by interpreting the QR code.

Following, the DID application 10 of the first user device may generate the user signature by signing the signature verification value with the user private key at a step of S25.

Next, the DID application 10 of the first user device may transmit the user signature and the user DID to the DID authentication server 100 at a step of S26. Herein, the DID application 10 of the first user device may additionally transmit the signature verification value to the DID authentication server 100 for the DID authentication server 100 to verify the user signature.

If the user information list is initially transmitted along with the signature verification value from the service provider server 300, the DID application 10 of the first user device may transmit the user information corresponding to the user information list or the encrypted user information corresponding to the user information list along with the user signature and the user DID. Furthermore, the DID application 10 of the first user device may additionally transmit the VC (Verifiable Credential) or the VP (Verifiable Presentation) along with the user signature and the user DID to the DID authentication server 100.

In response to receiving the user signature and the user DID from the DID application 10 of the first user device, the DID authentication server 100 may acquire the user public key directly from the blockchain network 200 by using the user DID or request the user public key through a resolver server 400 at a step of S27. In the latter case, the resolver server 400 may request for the user public key to the blockchain network 200 by using the user DID at a step of S28. Once the user public key is acquired by the resolver server 400 from the blockchain network 200 at a step of S29, the DID authentication server 100 may acquire the user public key from the resolver server 400 at a step of S30.

Subsequently, the DID authentication server 100 may verify the user signature at a step of S31 by verifying whether the signature verification value obtained from decoding the user signature with the user public key matches with the signature verification value transmitted along with the user signature from the DID application 10 of the first user device and transmit the signature verification result information acquired by verifying the user signature to the service provider server 300 at a step of S32. Herein, as requested by the service provider server 300, the DID authentication server 100 may additionally transmit the user information corresponding to the user information list or the encrypted user information corresponding to the user information list to the service provider server 300.

Then, the service provider server 300 may provide the DID service corresponding to the DID service request information to the service webpage or the service application 20 of the second user device by referring to the signature verification result information at a step of S33. Also, the service provider server 300 may perform the processes necessary for providing the DID service by referring to the user information or the encrypted user information acquired from the DID authentication server 100.

On the other hand, while it is possible for the DID authentication server 100 to verify the user signature by using the user signature and the user DID as explained above, it is also possible for the service provider server 300 to verify the user signature by using the user signature and the user DID transmitted from the DID authentication server 100. Accordingly, if the DID authentication server 100 transmits the user signature and the user DID to the service provider server 300, the service provider server 300 may acquire the user public key from the blockchain network 200 directly by using the user DID or acquire the user public key from the blockchain network 200 through the resolver server 400 by using the user DID, and thus verify the user signature by using the user public key and provide the DID service corresponding to the DID service request information to the service webpage or the service application 20 of the second user device. Herein, the service provider server 300 may verify the user signature by using the signature verification value generated in response to the DID service request information transmitted from the service webpage or the service application 20 of the second user device.

Herein, when the user signature and the user DID are transmitted from the DID application 10 of the first user device, the DID authentication server 100 may transmit the user signature and the user DID or the signature verification result information, generated by referring to the user signature and the user DID, to the DID authentication webpage corresponding to the DID authentication server 100 through the HTTP polling, and thus transmit the user signature and the user DID or the signature verification result information to the service provider server 300 through HTTP redirection.

Another process of providing the authentication service to the service provider server 300 through the DID application 10 in accordance with still another example embodiment of the present disclosure by using the DID authentication server 100 configured as explained in FIG. 1 is described by referring to FIG. 4. In the following description, detailed explanation of parts that can be easily understood from the description provided by referring to FIGS. 2 and 3 are omitted. Herein, FIG. 4 in accordance with still another example embodiment of the present disclosure is schematically illustrating a method in which the DID authentication server 100 provides the authentication service by using the DID application 10 when the user requests for the DID service through a service webpage or a service application 11 of the first user device installed with the DID application 10 instead of the service webpage or the service application 20 of the second user device. Herein, the DID application 10 installed on the first user device has been used for generating the user DID of the user, and the first user device installed with the DID application 10 is referred to as a "user device" in the explanation below for the convenience of explanation since the second user device is not used in still another example embodiment of the present disclosure illustrated by FIG. 4.

Herein, the method of generating the user DID is first explained prior to demonstrating the method for providing the authentication service through the DID application.

First, in order to generate the user DID, the user may make the request for the issuance of the user DID to the blockchain network 200 (not shown) by using the DID application 10 installed on the user device which is the mobile device.

Then, in response to the request for the issuance of the user DID from the DID application of the user device, at least one node included in the blockchain network 200 may generate the user DID and store the DID information corresponding to the user DID in the distributed ledger of the blockchain network 200 (not shown). Herein, the DID information may include the user DID, the user public key of the user, the authentication information for the user private information, but is not limited thereto, and may include various information related to the user DID.

Also, the DID application 10 of the user device may store the user private information related to the user DID (not shown). For example, the DID application 10 of the user device may store the Verifiable Credential (VC) corresponding to the user private information verified by the authentication server in the user device. Also, the blockchain network 200 sharing the distributed ledger with the plurality of nodes may generate the blocks comprised of the transactions verified by the distributed consensus from the nodes and store the blocks in the distributed ledger (not shown).

Thereafter, in a process of using the plurality of services provided by the service provider server 300 through the service webpage or the service application 11 of the user device, the user who has created the user DID as explained above may select the DID service, such as the membership subscription service, the verification service, the transaction service, etc., that requires the user DID. In turn, the service webpage or the service application 11 of the user device may transmit the DID service request information corresponding to the DID service to the service provider server 300 at a step of S41.

In response to receiving the DID service request information from the service webpage or the service application 11 of the user device, the service provider server 300 may generate a signature verification value and transmit the signature verification value to the service webpage or the service application 11 of the user device at a step of S42. Herein, the service provider server 300 may only transmit the signature verification value or transmit both the signature verification value and the user DID.

In addition, when the DID service, such as the membership subscription service, requires additional user information, such as the name, the phone number, etc., the service provider server 300 may transmit the user information list corresponding to the user information at the same time with the signature verification value to the service webpage or the service application 11 of the user device.

Then, the service webpage or the service application 11 of the user device may provide the signature verification value transmitted from the service provider server 300 to the DID application 10 of the user device through URL scheme at a step of S43.

Thereafter, the DID application 10 of the user device may generate the user signature by signing the signature verification value with the user private key at a step of S44.

Next, the DID application 10 of the user device may transmit the user signature and the user DID to the DID authentication server 100 at a step of S45.

If the user information list is initially transmitted along with the signature verification value from the service provider server 300, the DID application 10 of the user device may transmit the user information corresponding to the user information list or the encrypted user information corresponding to the user information list along with the user signature and the user DID. Also, the DID application 10 of the user device may additionally transmit the signature verification value to the DID authentication server 100 to thereby allow the DID authentication server 100 to verify the user signature. Furthermore, the DID application 10 of the user device may additionally transmit the VC (Verifiable Credential) or the VP (Verifiable Presentation) along with the user signature and the user DID to the DID authentication server 100.

In response to receiving the user signature and the user DID from the DID application 10 of the user device, the DID authentication server 100 may acquire the user public key directly from the blockchain network 200 by using the user DID or request the user public key through the resolver server 400 at a step of S46. In the latter case, the resolver server 400 may request for the user public key to the blockchain network 200 by using the user DID at a step of S47. Once the user public key is acquired by the resolver server 400 from the blockchain network 200 at a step of S48, the DID authentication server 100 may acquire the user public key from the resolver server 400 at a step of S49.

Subsequently, the DID authentication server 100 may verify the user signature at a step of S50 by verifying whether the signature verification value obtained from decoding the user signature with the user public key matches with the signature verification value transmitted along with the user signature from the DID application 10 of the user device and transmit the signature verification result information acquired by verifying the user signature to the service provider server 300 at a step of S51. Herein, as requested by the service provider server 300, the DID authentication server 100 may additionally transmit the user information corresponding to the user information list or the encrypted user information corresponding to the user information list to the service provider server 300.

Then, the service provider server 300 may provide the DID service corresponding to the DID service request information to the service webpage or the service application 11 of the user device by referring to the signature verification result information at a step of S52. Also, the service provider server 300 may perform processes necessary for providing the DID service by referring to the user information or the encrypted user information acquired from the DID authentication server 100.

On the other hand, while it is possible for the DID authentication server 100 to verify the user signature by using the user signature and the user DID as explained above, it is also possible for the service provider server 300 to verify the user signature by using the user signature and the user DID transmitted from the DID authentication server 100. Accordingly, if the DID authentication server 100 transmits the user signature and the user DID to the service provider server 300, the service provider server 300 may acquire the user public key from the blockchain network 200 directly by using the user DID or acquire the user public key from the blockchain network 200 through the resolver server 400 by using the user DID, and thus verify the user signature by using the user public key and provide the DID service corresponding to the DID service request information to the service webpage or the service application 11 of the user device. Herein, the service provider server 300 may verify the user signature by using the signature verification value generated in response to the DID service request information transmitted from the service webpage or the service application 11 of the user device.

Also, in the process of transmitting the user signature and the user DID or the signature verification result information, generated by referring to the user signature and the user DID, to the service provider server 300, the DID authentication server 100 may adopt a method of transmitting the user signature and the user DID or the signature verification result information to a DID authentication webpage corresponding to the DID authentication server through the HTTP polling, to thereby transmit the user signature and the user DID or the signature verification result information to the service provider server through the HTTP redirection. As another method of transmitting the user signature and the user DID or the signature verification result information to the service provider server 300, the DID authentication server 100 may allow the DID application 10 of the user device to transmit the user signature and the user DID to the DID authentication server 100, to thereby allow the service webpage or the service application 11 of the user device to acquire the user signature and the user DID or the signature verification result information from the DID authentication server 100 through the HTTP polling, and thus transmit the user signature and the user DID or the signature verification result information to the service provider server 300 through the HTTP redirection.

Apart from these, in case the DID application 10 of the user device directly transmits the user signature and the user DID to the service provider server 300, the DID application 10 of the user device may provide the user signature and the user DID to the service webpage or the service application 11 of the user device through the URL scheme, to thereby allow the service webpage or the service application 11 of the user device to transmit the user signature and the user DID to the service provider server 300 through the HTTP redirection.

The present disclosure has an effect of enabling the user authentication without requiring the service provider server to issue a user ID.

The present disclosure has another effect of enabling the user authentication on the service provider server without requiring additional information for the user authentication.

The present disclosure has still another effect of performing the user authentication by using the decentralized identity (DID) application installed on the user device.

The present disclosure has still yet another effect of providing the authentication service to the service provider server by using the DID application.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing an authentication service by using a decentralized identity (DID) application of a first user device, the method comprising:
   (a) in response to a DID service request information corresponding to a DID service requested by the second user device, transmitting a signature verification value generated from a service provider server via a second user device;
   transmitting, via a DID authentication server, the signature verification value to the DID application installed on the first user device to allow the DID application of the first user device to generate a user signature,
      wherein the user signature is generated by signing the signature verification value with a user private key and transmitting the user signature and a user DID to the DID authentication server,
      wherein the second user device accesses the DID service provided by the service provider server through a service web page or a service application,
      wherein the first user device is a mobile device, and
      wherein the second user device is a separate device from the first user device installed with the DID application which has been used for registering the user DID on a blockchain network comprised of a plurality of nodes;
   in response to a determination that the signature verification value is transmitted from the service provider server without the user DID, generating, via the DID authentication server, a QR code corresponding to the signature verification value and transmitting the QR code to the second user device to allow the first user device to acquire the signature verification value from the QR code displayed on the second user device and provide the signature verification value to the DID application;
   in response to a determination that the signature verification value and the user DID are transmitted from the service provider server, transmitting, via the DID authentication server, the signature verification value to the DID application of the first user device by using the user DID; and
   (b) in response to receiving the user signature and the user DID from the DID application of the first user device, acquiring, via the DID authentication server, a user public key from the blockchain network directly by using the user DID or acquiring the user public key from the blockchain network through a resolver server by using the user DID to verify the user signature, wherein the verification comprises using the user public key and transmitting signature verification result information acquired by verifying the user signature to the service provider server to allow the service provider server to provide the DID service corresponding to the DID service request information to the second user device by referring to the signature verification result information, or transmitting, via the DID authentication server, the user signature and the user DID to the service provider server to allow the service provider server to acquire the user public key from the blockchain network directly by using the user DID or acquire the user public key from the blockchain network through the resolver server by using the user DID to verify the user signature by using the user public key and provide the DID service corresponding to the DID service request information to the second user device.

2. The method of claim 1 wherein, when the signature verification value and the user DID are transmitted from the service provider server, if the DID application fails to receive the signature verification value, the DID authentication server generates the QR code corresponding to the signature verification value and transmits the QR code to the second user device to allow the first user device to acquire the signature verification value from the QR code displayed on the second user device and transmit the signature verification value to the DID application.

3. The method of claim 1, wherein, in response to a determination that the service provider server transmits a user information list corresponding to user information additionally required by the DID service to the second user device, transmitting, via the DID authentication server, the signature verification value and the user information list to the DID application of the first user device to allow the DID application of the first user device to transmit the user information corresponding to the user information list or encrypted user information corresponding to the user information list along with the user signature and the user DID to the DID authentication server, such that the user information or the encrypted user information is transmitted to the service provider server along with the signature verification result information or along with the user signature and the user DID.

4. The method of claim 1, wherein, allowing, via the DID authentication server, the DID application of the first user device to transmit the signature verification value along with the user signature and the user DID to the DID authentication server.

5. The method of claim 1, wherein, allowing, via the DID authentication server, the DID application of the first user device to transmit a VC (Verifiable Credential) or a VP (Verifiable Presentation) along with the user signature and the user DID to the DID authentication server.

6. The method of claim 1, wherein, allowing, via the DID authentication server, the service provider server to transmit the signature verification value to the second user device through HTTP redirection, and thus acquiring the signature verification value by allowing the second user device to transmit the signature verification value to a DID authentication webpage corresponding to the DID authentication server through the HTTP redirection.

7. The method of claim 1, wherein, in response to a determination that the user signature and the user DID are transmitted from the DID application of the first user device, transmitting, via the DID authentication server, the user signature and the user DID or the signature verification result information, generated by referring to the user signature and the user DID, to a DID authentication webpage corresponding to the DID authentication server through HTTP polling, and thus transmitting the user signature and the user DID or the signature verification result information to the service provider server through HTTP redirection.

8. A method for providing an authentication service by using a decentralized identity (DID) application of a user device, the method comprising:

(a) in response to a signature verification value generated from a service provider server being transmitted to a service webpage or a service application of the user device and provided to the DID application of the user device in response to a DID service request information corresponding to a DID service requested through the service webpage or the service application of the user device, allowing, via a DID authentication server, the DID application of the user device to generate a user signature by signing the signature verification value with a user private key and transmitting the user signature and a user DID to the DID authentication server, wherein the DID application is used for registering the user DID on a blockchain network comprised of a plurality of nodes, wherein the user device comprises a mobile device;

in response to a determination that the signature verification value is transmitted from the service provider server without the user DID, generating, via the DID authentication server, a QR code corresponding to the signature verification value and transmitting the QR code to the second user device to allow the first user device to acquire the signature verification value from the QR code displayed on the second user device and provide the signature verification value to the DID application;

in response to a determination that the signature verification value and the user DID are transmitted from the service provider server, transmitting, via the DID authentication server, the signature verification value to the DID application of the first user device by using the user DID; and (b) in response to receiving the user signature and the user DID from the DID application of the user device, acquiring, via the DID authentication server, a user public key from the blockchain network directly by using the user DID or acquiring the user public key from the blockchain network through a resolver server by using the user DID to verify the user signature, wherein the verification comprises using the user public key and transmitting signature verification result information acquired by verifying the user signature to the service provider server to allow the service provider server to provide the DID service corresponding to the DID service request information to the user device by referring to the signature verification result information, or transmitting, via the DID authentication server, the user signature and the user DID to the service provider server to allow the service provider server to acquire the user public key from the blockchain network directly by using the user DID or acquire the user public key from the blockchain network through the resolver server by using the user DID to verify the user signature by using the user public key and provide the DID service corresponding to the DID service request information to the user device.

9. The method of claim 8, wherein, allowing, via the DID authentication server, the service webpage or the service application of the user device to provide the signature verification value to the DID application of the user device through URL scheme.

10. The method of claim 8, wherein, in response to the service provider server transmitting a user information list corresponding to user information additionally required by the DID service to the service webpage or the service application of the user device and the signature verification value and the user information list being provided to the DID application of the user device, allowing, via the DID authentication server, the DID application of the user device to transmit the user information corresponding to the user information list or encrypted user information corresponding to the user information list along with the user signature and the user DID to the DID authentication server, such that the user information or the encrypted user information is transmitted to the service provider server along with the signature verification result information or the user signature and the user DID being transmitted.

11. The method of claim 8, wherein, allowing, via the DID authentication server, the DID application of the user device to transmit the signature verification value along with the user signature and the user DID to the DID authentication server.

12. The method of claim 8, wherein, allowing, via the DID authentication server, the DID application of the user device to transmit a VC (Verifiable Credential) or a VP (Verifiable Presentation) along with the user signature and the user DID to the DID authentication server.

13. The method of claim 8, wherein,
transmitting, via the DID authentication server, the user signature and the user DID transmitted from the DID application of the user device or the signature verification result information, generated by referring to the user signature and the user DID, to a DID authentication webpage corresponding to the DID authentication server through HTTP polling, to transmit the user signature and the user DID or the signature verification result information to the service provider server through HTTP redirection,
transmitting, via the DID authentication server, the user signature and the user DID to the service webpage or the service application of the user device through URL scheme, to allow the service webpage or the service application of the user device to transmit the user signature and the user DID to the service provider server through the HTTP redirection, or
transmitting, via the DID authentication server, the user signature and the user DID to the DID authentication server, to allow the service webpage or the service application of the user device to acquire the user signature and the user DID or the signature verification result information, generated by referring to the user signature and the user DID, from the DID authentication server through HTTP polling, and transmit the user signature and the user DID or the signature verification result information to the service provider server through the HTTP redirection.

14. The method of claim 8, wherein, allowing, via the DID authentication server, the service provider server to only transmit the signature verification value to the user device or to transmit both the signature verification value and the user DID to the user device.

15. A DID (decentralized identity) authentication server for providing an authentication service by using a DID application of a first user device, the DID authentication server comprising:
at least one non-transitory memory that stores instructions; and
at least one processor configured to execute the instructions to perform or support another device to perform:
(I) in response to a DID service request information corresponding to a DID service requested by the second user device,
transmitting a signature verification value generated from a service provider server via a second user device;
transmitting the signature verification value to the DID application installed on the first user device to allow the DID application of the first user device to generate a user signature by signing the signature verification value with a user private key and transmit the user signature and a user DID to the processor,
wherein the first user device comprises a mobile device, and
wherein the second user device accessing the DID service provided by the service provider server through a service web page or a service application is a separate device from the first user device installed with the DID application which has been used for registering the user DID on a blockchain network comprised of a plurality of nodes,
in response to a determination that the signature verification value is transmitted from the service provider server without the user DID, generating, via the processor, a QR code corresponding to the signature verification value and transmitting the QR code to the second user device to allow the first user device to acquire the signature verification value from the QR code displayed on the second user device and provide the signature verification value to the DID application;
in response to a determination that the signature verification value and the user DID are transmitted from the service provider server, transmitting, via the processor, the signature verification value to the DID application of the first user device by using the user DID; and
(II) in response to receiving the user signature and the user DID from the DID application of the first user device,
(i) acquiring a user public key from the blockchain network directly by using the user DID or acquiring the user public key from the blockchain network through a resolver server by using the user DID to verify the user signature,
wherein the verification comprises using the user public key and transmitting signature verification result information acquired by verifying the user signature to the service provider server to allow the service provider server to provide the DID service corresponding to the DID service request information to the second user device by referring to the signature verification result information, or (ii) transmitting, via the DID authentication server, the user signature and the user DID to the service provider server to allow the service provider server to acquire the user public key from the blockchain network directly by using the user DID or acquire the user public key from the blockchain network through the resolver server by using the user DID to verify the user signature by using the user public key and provide the DID service corresponding to the DID service request information to the second user device.

16. The DID authentication server of claim 15, wherein, in response to a determination that the signature verification value and the user DID are transmitted from the service provider server, if the DID application fails to receive the signature verification value, generating, via the processor, the QR code corresponding to the signature verification value and transmitting the QR code to the second user device to allow the first user device to acquire the signature verification value from the QR code displayed on the second user device and thus transmit the signature verification value to the DID application.

17. The DID authentication server of claim 15, wherein, in response to a determination that the service provider server transmits a user information list corresponding to user information additionally required by the DID service to the second user device, transmitting, via the processor, the signature verification value and the user information list to the DID application of the first user device to allow the DID application of the first user device to transmit the user information corresponding to the user information list or encrypted user information corresponding to the user information list along with the user signature and the user DID to the processor, such that the user information or the encrypted user information is transmitted to the service provider server along with the signature verification result information or along with the user signature and the user DID.

18. The DID authentication server of claim 15, wherein, allowing, via the processor, the DID application of the first user device to transmit the signature verification value along with the user signature and the user DID to the processor.

19. The DID authentication server of claim 15, wherein, allowing, via the processor, the DID application of the first user device to transmit a VC (Verifiable Credential) or a VP (Verifiable Presentation) along with the user signature and the user DID to the processor.

20. The DID authentication server of claim 15, wherein, allowing, via the processor, the service provider server to transmit the signature verification value to the second user device through HTTP redirection, and acquiring the signature verification value by allowing the second user device to transmit the signature verification value to a DID authentication webpage corresponding to the processor through the HTTP redirection.

21. The DID authentication server of claim 15, wherein, in response to a determination that the user signature and the user DID are transmitted from the DID application of the first user device, transmitting, via the processor, the user signature and the user DID or the signature verification result information, generated by referring to the user signature and the user DID, to a DID authentication webpage corresponding to the processor through HTTP polling, and transmitting the user signature and the user DID or the signature verification result information to the service provider server through HTTP redirection.

22. A DID (decentralized identity) authentication server for providing an authentication service by using a DID application of a first user device, the DID authentication server comprising:
at least one non-transitory memory that stores instructions; and
at least one processor configured to execute the instructions to perform or support another device to perform:
(I) in response to a signature verification value generated from a service provider server being transmitted to a service webpage or a service application of the user device and being provided to the DID application of the user device in response to a DID service request information corresponding to a DID service requested through the service webpage or the service application of the user device, allowing the DID application of the user device to generate a user signature by signing the signature verification value with a user private key and transmitting the user signature and a user DID to the processor,
wherein the DID application has been used for registering the user DID on a blockchain network comprised of a plurality of nodes, and
wherein the first user device comprises a mobile device,
in response to a determination that the signature verification value is transmitted from the service provider server without the user DID, generating, via the processor, a QR code corresponding to the signature verification value and transmitting the QR code to the second user device to allow the first user device to acquire the signature verification value from the QR code displayed on the second user device and provide the signature verification value to the DID application;
in response to a determination that the signature verification value and the user DID are transmitted from the service provider server, transmitting, via the processor, the signature verification value to the DID application of the first user device by using the user DID;
(II) in response to receiving the user signature and the user DID from the DID application of the user device,
(i) acquiring a user public key from the blockchain network directly by using the user DID or acquiring the user public key from the blockchain network through a resolver server by using the user DID and verifying the user signature by using the user public key and transmitting signature verification result information acquired by verifying the user signature to the service provider server, to allow the service provider server to provide the DID service corresponding to the DID service request information to the user device by referring to the signature verification result information, or
(ii) transmitting the user signature and the user DID to the service provider server, to allow the service provider server to acquire the user public key from the blockchain network directly by using the user DID or acquire the user public key from the blockchain network through the resolver server by using the user DID, and verify the user signature by using the user public key and provide the DID service corresponding to the DID service request information to the user device.

23. The DID authentication server of claim 22, wherein, allowing, via the processor, the service webpage or the service application of the user device to provide the signature verification value to the DID application of the user device through URL scheme.

24. The DID authentication server of claim 22, wherein, in response to a determination that the service provider server transmits a user information list corresponding to user information additionally required by the DID service to the service webpage or the service application of the user device and thus the signature verification value and the user information list are provided to the DID application of the user device, allowing, via the processor, the DID application of the user device to transmit the user information corresponding to the user information list or encrypted user information corresponding to the user information list along with the user signature and the user DID to the processor, such that the user information or the encrypted user information is transmitted to the service provider server along with the signature verification result information or the user signature and the user DID being transmitted.

25. The DID authentication server of claim 22, wherein, allowing, via the processor, the DID application of the user device to transmit the signature verification value along with the user signature and the user DID to the processor.

26. The DID authentication server of claim 22, wherein, allowing, via the processor, the DID application of the user device to transmit a VC (Verifiable Credential) or a VP (Verifiable Presentation) along with the user signature and the user DID to the processor.

27. The DID authentication server of claim 22, wherein,
 (i) transmitting, via the processor, the user signature and the user DID transmitted from the DID application of the user device or the signature verification result information, generated by referring to the user signature and the user DID, to a DID authentication webpage corresponding to the processor through HTTP polling, to transmit the user signature and the user DID or the signature verification result information to the service provider server through HTTP redirection,
 (ii) allowing, via the processor, the DID application of the user device to transmit the user signature and the user DID to the service webpage or the service application of the user device through URL scheme, to allow the service webpage or the service application of the user device to transmit the user signature and the user DID to the service provider server through the HTTP redirection, or
 (iii) allowing, via the processor, the DID application of the user device to transmit the user signature and the user DID to the processor, to allow the service webpage or the service application of the user device to acquire the user signature and the user DID or the signature verification result information, generated by referring to the user signature and the user DID, from the processor through HTTP polling, and transmit the user signature and the user DID or the signature verification result information to the service provider server through the HTTP redirection.

28. The DID authentication server of claim 22, wherein, allowing, via the processor, the service provider server to only transmit the signature verification value to the user device or to transmit both the signature verification value and the user DID to the user device.

* * * * *